UNITED STATES PATENT OFFICE.

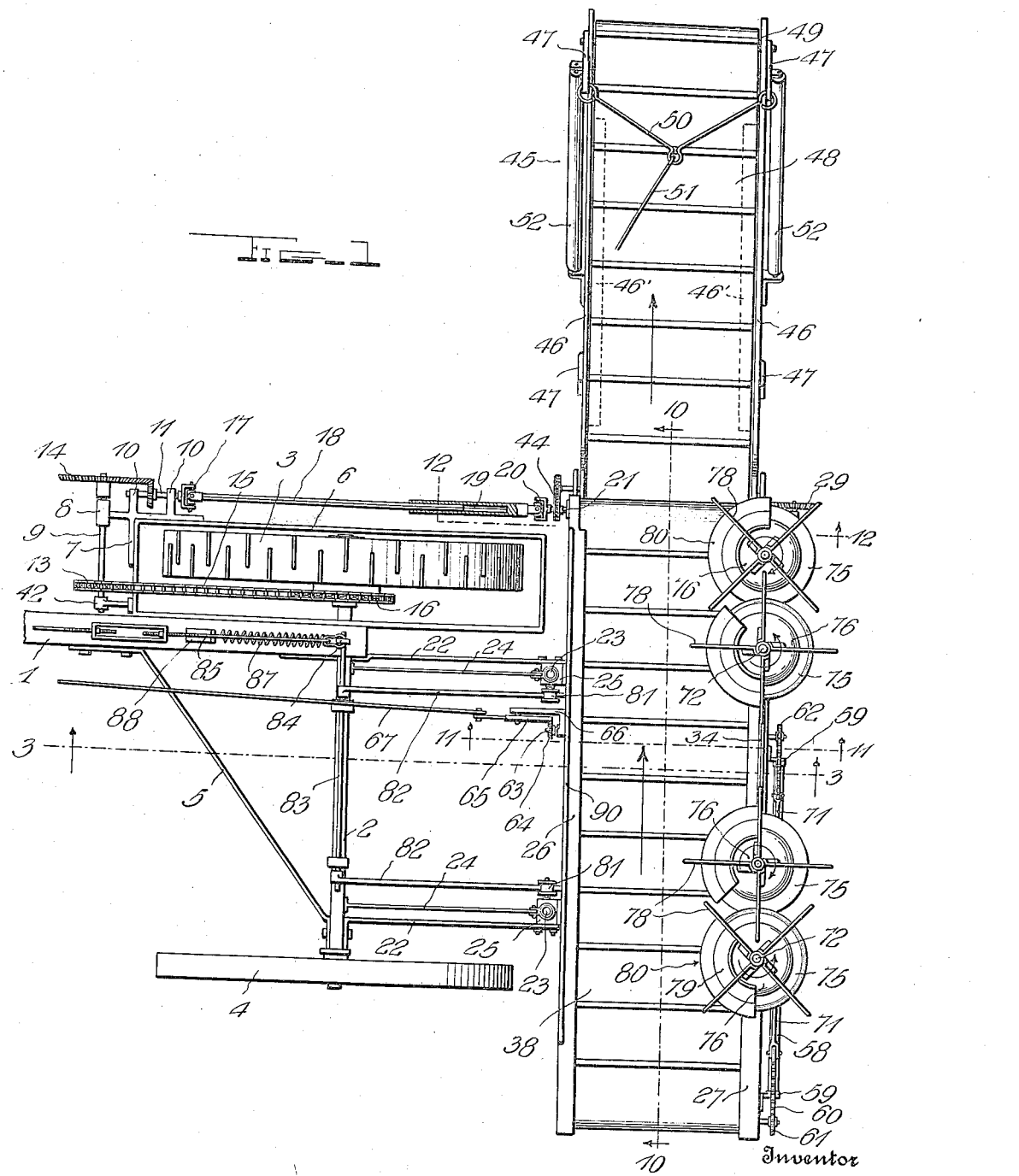

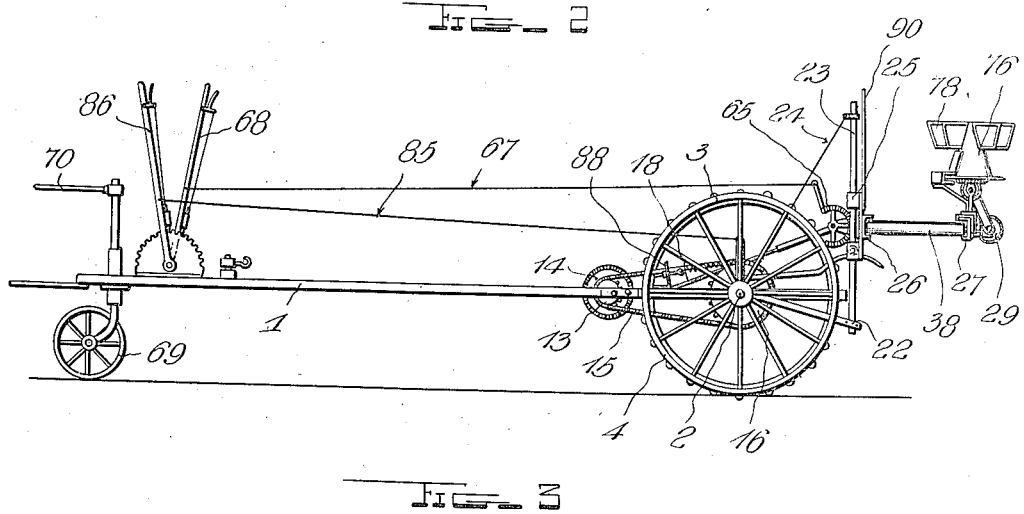

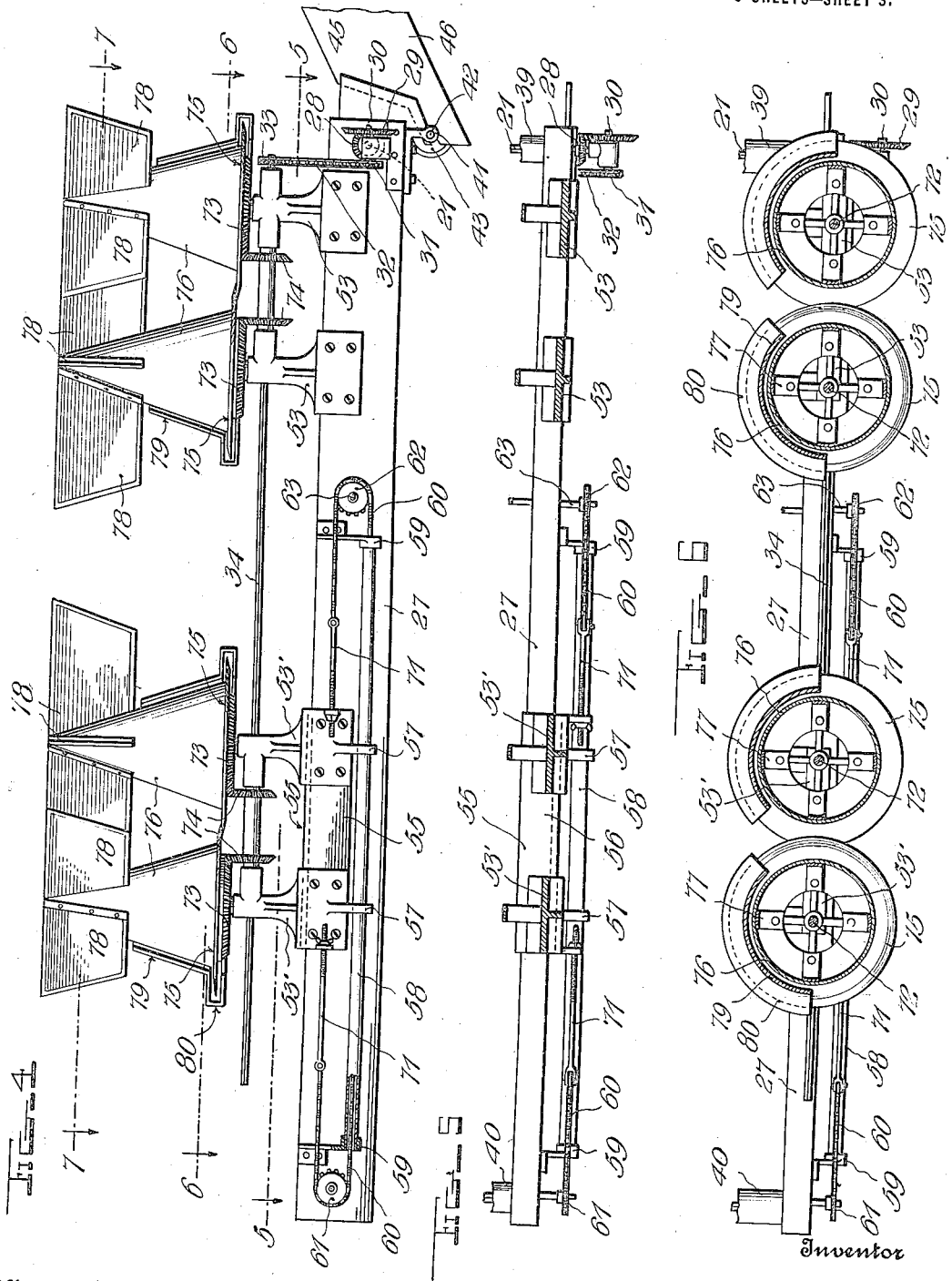

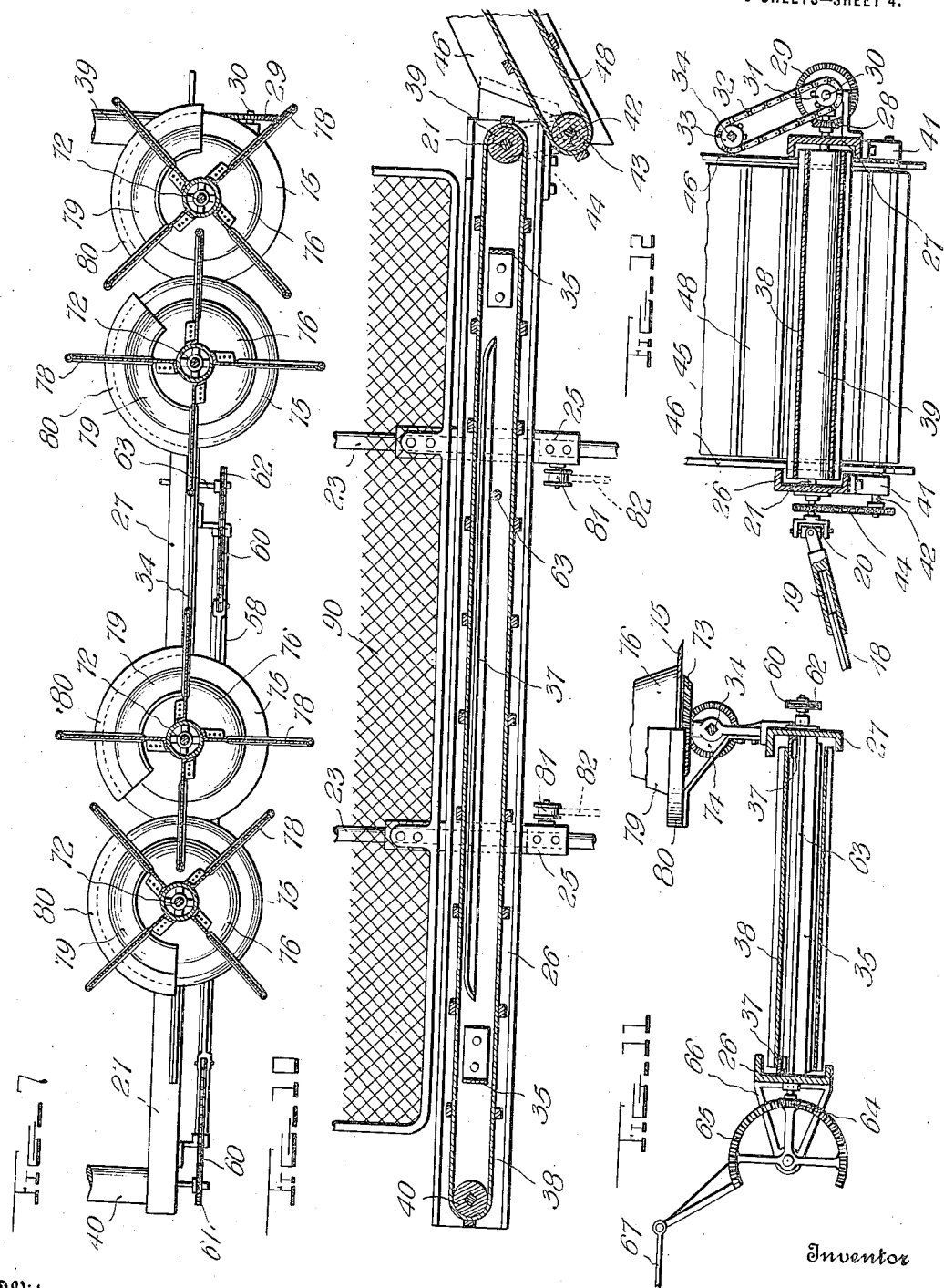

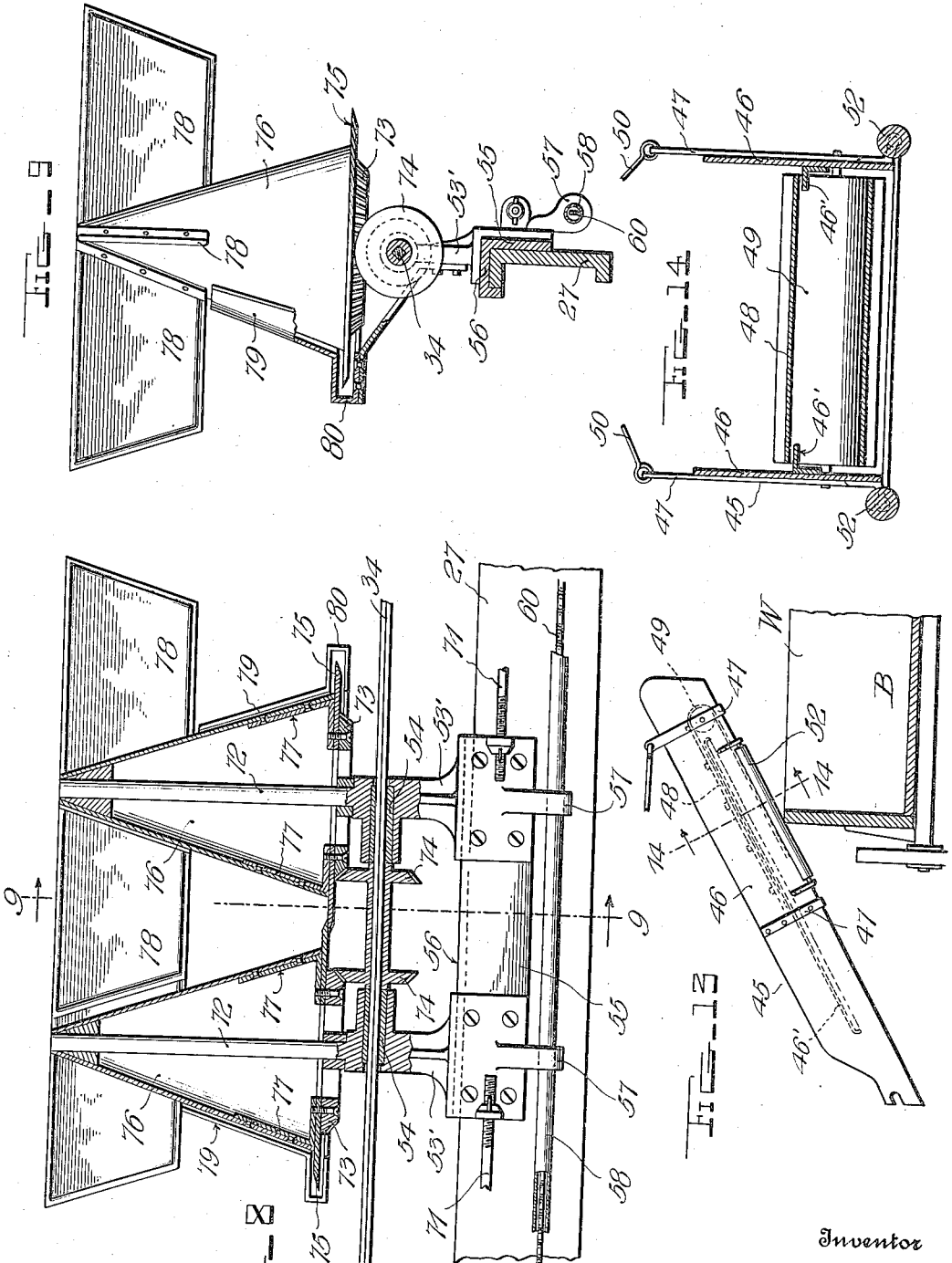

CLAUDE WOODALL, OF SUPPLY, OKLAHOMA.

KAFIR-CORN HEADER.

1,141,372.   Specification of Letters Patent.   Patented June 1, 1915.

Application filed October 22, 1914. Serial No. 868,047.

*To all whom it may concern:*

Be it known that I, CLAUDE WOODALL, a citizen of the United States, residing at Supply, in the county of Woodward and State of Oklahoma, have invented certain new and useful Improvements in Kafir-Corn Headers; and I do declare the following to be a full, clear, and exact description of the invention, such as will enable others skilled in the art to which it appertains to make and use the same.

My invention relates broadly to improvements in agricultural implements and specifically to Kafir corn headers.

The main object of the invention is to provide an extremely simple machine of this character which will be highly efficient in its operation.

To the above end, a further object becomes to simplify the frame structure of devices of this character to such an extent as to eliminate all unnecessary details.

Yet another object is to provide pairs of cone-shaped shields rising from pairs of cutting disks, and to equip said shields with arms which retain the severed heads of the plants in upright position until they are dropped upon a conveyer. The provision of the shields and the arms thereon therefore prevents the heads from being beaten to such an extent as to cause a number of the seeds therein to be lost.

A still further object is to provide simple structure whereby cutting mechanism employed at one side of the machine may be moved toward and away from similar mechanism employed at the other side, thereby rendering the machine applicable for cutting rows spaced at various distances.

With the above and minor objects in view, the invention resides in certain novel features of construction and combination herein described and claimed and shown in the drawings wherein:—

Figure 1 is a plan view of a machine constructed in accordance with my invention; Fig. 2 is a side view thereof on a reduced scale; Fig. 3 is a vertical longitudinal section as seen on the line 3—3 of Fig. 1; Fig. 4 is a front end view of a portion of the machine; Figs. 5, 6 and 7 are horizontal sections as seen on the lines 5—5, 6—6 and 7—7 of Fig. 4; Fig. 8 is an enlarged view similar to Fig. 4, with parts broken away and in section; Fig. 9 is a detail vertical section as seen on the line 9—9 of Fig. 8; Fig. 10 is a transverse section taken along the plane of the line 10—10 of Fig. 1; Fig. 11 is a detail longitudinal section as seen on the line 11—11 of Fig. 1; Fig. 12 is a similar view taken substantially upon the plane of the line 12—12 of Fig. 1; Fig. 13 is a front elevation of a portion of the delivery conveyer; and Fig. 14 is a vertical transverse section thereof as seen on the line 14—14 of Fig. 13.

In the accompanying drawings (see more particularly Figs. 1, 2 and 3), the numeral 1 designates a longitudinal tongue whose forward end is secured by any appropriate means to a transverse axle 2 whose opposite ends are provided with spindles upon which the drive wheel 3 and a supporting wheel 4 are revolubly mounted, said tongue being preferably braced, in respect to the axle, by means indicated at 5 or by the equivalent thereof.

Secured to one side of the tongue 1 by any appropriate means, and preferably surrounding the intermediate portion of the wheel 3, is a rectangular frame 6 to whose rear outer corner a bracket 7 is secured, said bracket carrying a bearing 8 in which a transverse shaft 9 is mounted and a pair of brackets 10 in which a longitudinal shaft 11 is supported. The shaft 9 is supported, at its inner end, by a second bearing 12 and carries a gear 13 on said inner end while its outer end is equipped with a comparatively large bevel gear 14, said gear 13 being connected by a chain 15 to a driving gear 16 which rotates with the drive wheel 3.

The forward end of the shaft 11 is connected by a universal joint 17 to a longitudinal forwardly extending shaft 18 which is preferably squared throughout its length and whose forward end slides within a sleeve 19 connected by a universal joint 20 to a third longitudinal shaft 21, the latter being mounted in a manner to be described.

Projecting forwardly and preferably downwardly from the axle 2, is a pair of transversely spaced arms 22 to whose free ends upright standards 23 are secured, said standards rising from said arms and being suitably braced as seen at 24. Mounted for vertical movement on the standards 23, are bearings 25 which are carried by the rear transverse bar 26 of a conveyer frame, said bar 26 as well as the front bar 27 of said frame, being preferably formed of channel iron bars as clearly seen in the various figures of the drawings. By reference, more particularly to Fig. 12, it will be seen that the shaft 21 passes revolubly through openings in the bars 26 and 27 and carries a beveled pinion 28 on its forward end, said pinion meshing with a bevel gear 29 on a revolubly mounted stub shaft 30, the latter carrying a sprocket gear 31, which through the instrumentality of a sprocket chain 32, drives a second sprocket gear 33 which is keyed on a transverse shaft 34 which is spaced above the front bar 27 and upheld in a manner to be set forth.

As most clearly indicated in Fig. 10, the opposite ends of the bars 26 and 27 are connected by transverse bars 35, while the intermediate portions of said bars are provided with angle iron rails 37 upon which the upper stretch of an endless conveyer 38 travels, said conveyer passing over a roller 39 which rotates with the shaft 21 and over a second roller 40 at the opposite end of the frame, as shown.

The left ends of the bars 26 and 27 are provided with depending bearings 41 (see Fig. 4), said bearings revolubly supporting a longitudinal shaft 42 upon which a roller 43 is keyed, said shaft being driven through the instrumentality of a sprocket chain 44 from the shaft 21 (see more particularly Fig. 12).

Pivotally supported by the shaft 42, is the inner end of an upwardly and outwardly inclining conveyer 45 which is preferably constructed as seen in Figs. 13 and 14, this construction including a pair of spaced upwardly and outwardly inclining side walls 46 which are connected at intervals by transverse bars 47 whose ends are preferably turned upwardly and secured to said sides 46. Secured to the inner faces of the walls 46, are angle iron brackets 46' upon which the upward stretch of an endless conveyer 48 travels, said conveyer passing over the roller 43 and over a similar roller 49 at the upper end of the conveyer, which upper end may be supported by a bail 50 secured thereto and by a cable 51 which may lead from the bail to an appropriate part of the machine.

The carrier or conveyer 45 is designed to have its outer end positioned above the bed B of a wagon W which may be driven along the side of the heading machine. It therefore becomes expedient to provide said conveyer with a pair of rollers 52 on its lower corners which are designed to contact with said bed as seen in Fig. 13, thereby preventing mutilation of the carrier in case the wagon and the harvesting machine do not move at the same speed.

Rising from the left hand end of the front bar 27 is a pair of upright brackets 53 which are secured to said end and which carry bearings provided with bushings through which the left end of the shaft 34 passes, the right end thereof passing through similar bushings 54 (see Fig. 8) carried revolubly by a second pair of upright brackets 53', the latter being rigidly secured to a carriage 55 which may slide upon the right hand end of the bar 27, said end therefore constituting a track.

The carriage 55, as most clearly seen in Figs. 8 and 9, is formed of a single metal plate which contacts with the upper half of the bar 27, at its forward side, while the upper edge of said plate is bent laterally as seen at 56 and then extended downwardly into contact with the inner edge of the upper flange on said bar 27.

Each bracket 53' is provided with a depending bearing 57 which is spaced forwardly from the bar 27, said bearings being mounted to slide upon a hollow transverse track 58 whose opposite ends are secured by brackets 59 to said bar. Passing through the hollow shaft 58, is a flexible operating element 60, here shown in the form of a chain which passes over a guide wheel 61 at the right side of the machine and over a second guide wheel 62 near the left side thereof, the last named wheel being keyed on a longitudinal shaft 63 which passes revolubly through the bars 26 and 27 and carries a beveled pinion 64 on its rear end. The pinion 64 meshes with a segmental rack 65 which is supported, to oscillate upon a bracket 66 which extends rearwardly from the bar 26, and is provided with an operating arm to which a rearwardly extending rod 67 is pivoted, said rod having its rear end pivoted to an upright lever 68 mounted on the rear end of the tongue 1, which end is supported by a combined supporting and steering wheel 69 which may be turned by a steering handle 70. By this construction, it will be seen that movement of the lever 68 will, through the instrumentality of the rack 65 and gear 62, move the chain 60, the ends of this chain being connected by adjusting bolts 71 to the opposite ends of the carriage 55, whereby said carriage will be adjusted toward or away from the brackets 53, as desired, it being understood that the shaft 34 is not shifted during this movement, but that the bushings 54 slide thereon.

Rising from the brackets 53 and 53', are upright spindles 72 which revolubly support bevel gears 73, the latter meshing with similarly shaped pinions 74 which rotate with the shaft 34. Secured to the upper sides of the gears 73, are cutting disks or rings 75 whose edges overlap and are sharpened as clearly shown, while rising from the rings 75 are hollow cone shaped feed members or shields 76 whose upper ends are provided with bearings which rotate upon the spindles 72. These shields may be secured to the rings in any suitable manner, but a plurality of L-shaped brackets 77 are preferably employed for this purpose. Radiating from the upper ends of the shields 76, are intermeshing series of arms or blades 78 which operate in a manner to be described.

The rear sides of the shields 76 are here shown as surrounded by guards 79 having laterally bulged lower ends 80 which guard the active edges of the rings 75, said guards serving to cause the heads, severed from the plants, to fall from the cutters onto the conveyer 38 which moves in the direction of the arrow in Fig. 1, thereby depositing the heads or tassels onto the second conveyer 48 which discharges the same into the wagon bed B.

Although any appropriate means could be provided for raising and lowering the frame upon which the conveyer 38 is mounted, certain of the bearings 25 are shown as provided with anti-friction rollers 81 beneath which the curved ends of a pair of parallel arms 82 project, the rear ends of said arms being rigidly mounted upon a transverse rock shaft 83 which is mounted in bearings upon the axle 2 and which is provided with an operating arm 84 from which an operating link 85 projects rearwardly to an operating lever 86 located adjacent the lever 68. It will be understood that actuation of this lever 86 in the proper direction, will raise the arms 82 thereby raising the bearings 25 and all parts supported thereby. During this raising and lowering movement, the squared shaft 18 slides within the sleeve 19, whereby, no matter at what height the frame be adjusted, the conveyer therein and the various shafts mounted thereon, will always be driven as the machine is propelled forwardly.

Since there is considerable weight to be raised by the arms 82, a coiled spring 87 is preferably employed to assist in rocking the shaft 83 in the direction to raise said arms, one end of said spring being here shown as connected to the arm 84 while the rear end thereof is adjustably secured to a bracket 88 which rises from the tongue 1.

From the foregoing description, taken in connection with the accompanying drawings, it will be seen that a comparatively simple machine has been provided for carrying out the objects of the invention, yet that such a machine will possess a number of advantageous features to be more clearly pointed out in the following explanation.

With the parts constructed and arranged as above described and as shown in the drawings, the entire machine is propelled forwardly over the field, the conveyer frame having been previously adjusted to the proper height to correctly position the cutting disks 75, which disks now sever the stalks of the plants while the blades 78, being slowly rotated in the direction indicated by the arrows in Fig. 1, support the tops of the heads of said plants, said heads being also supported, to an appreciable extent, by the cones 76, it being understood that their lower ends will rest upon the rings 75 until the shields 79 are encountered, after which, said heads will fall upon the conveyer 38, from which they will be deposited upon the apron of the inclined conveyer 45, said apron now lifting said heads and depositing them into the wagon bed.

During the operation of the machine, should it be necessary to adjust the cutting mechanism at the right side of the machine toward or away from that at the left hand side of the machine, this may be readily done by proper manipulation of the lever 68, which lever operates the construction hereinbefore described to shift the carriage upon the bar 27.

I have described the invention with considerable detail and have set forth certain specific formations for carrying out the objects of the invention, but it will be understood that numerous changes, regarding minor details of construction, may be resorted to without departing from the spirit or sacrificing any of the advantages of the invention as claimed.

In addition to the features above described, an upright guard or shield 90 is preferably provided, said guard rising from the rear side of the vertically adjustable conveyer frame as seen in Figs. 2, 3, and 10.

I claim:

1. A corn header including a transverse track, a carriage slidable thereon, a cutting mechanism mounted on said carriage, guides near the opposite ends of the track, a flexible operating element passing around said guides and connected to the carriage, and means whereby said element may be moved around said guides to adjust the carriage on the track, combined with means independent of said flexible element, for operating said mechanism.

2. A corn header including a transverse track, a carriage slidable thereon, a cutting mechanism mounted on said carriage, a guide wheel near one end of the track, a guide near the other end thereof, a flexible operating element passing around said guide and said wheel and secured to the carriage, and means whereby said guide wheel may be rotated in either direction to adjust the carriage on the track, combined with means independent of the flexible element, for actuating the cutting mechanism.

3. A corn header comprising a transverse track, a carriage slidable thereon, cutting mechanism on said carriage, a hollow track spaced from the first named track, a bearing on the carriage and slidably mounted on the hollow track, guides near the ends of the first track, a flexible operating element passing around said guides and through said hollow track, said element being connected to the carriage, and means whereby said element may be moved around the guides.

4. A corn header comprising a transverse track, a carriage slidable thereon and including an upright plate contacting with one side of the track, and a flange projecting laterally from the upper edge of said plate and overlying said track, the other edge of said flange being turned downwardly into contact with the other side of the track, cutting mechanism mounted on the carriage, a second track spaced from the first named track, and a bearing on the carriage and slidably mounted on the second track.

5. A Kafir corn header comprising a pair of parallel tracks spaced one from the other, a carriage plate having a hooked-shaped upper edge slidably and removably disposed on one of said tracks, and having a guide slidably engaging the other track, combined with cutting means carried by the carriage plate, and means to adjust the latter longitudinally in respect to the tracks.

6. A Kafir corn header comprising a pair of parallel tracks disposed in spaced relation, one of said tracks being hollow, a carriage having means engaging both tracks, cutting means carried by the carriage, a pair of guide wheels adjacent the two ends of the hollow track, a flexible element passing through said hollow track and around said wheels, the ends of said element being attached to the carriage, and means to impart movement to said element to adjust the carriage longitudinally upon the tracks.

7. A machine of the class described comprising a wheel supported frame, a vertical standard rising therefrom, a vertically movable bearing mounted on said standard, a guide carried by the bearing, a lever fulcrumed on the frame and having an arched end engaging said guide, and means to actuate said lever to raise and lower the bearing, combined with heading mechanism supported by said bearing.

8. A machine of the class described comprising a wheel supported frame, a pair of vertical standards rising therefrom, a pair of vertically movable bearings mounted on said standards and each having a guide, a rock shaft journaled on the frame, a pair of substantially horizontal arms projecting laterally from said shaft and having arched free ends disposed beneath said guides, and means to rock said shaft at will, combined with heading mechanism supported by said bearings.

In testimony whereof I have hereunto set my hand in presence of two subscribing witnesses.

CLAUDE WOODALL.

Witnesses:
 EZRA GASS,
 JAMES W. WOODALL.